Patented Feb. 19, 1924.

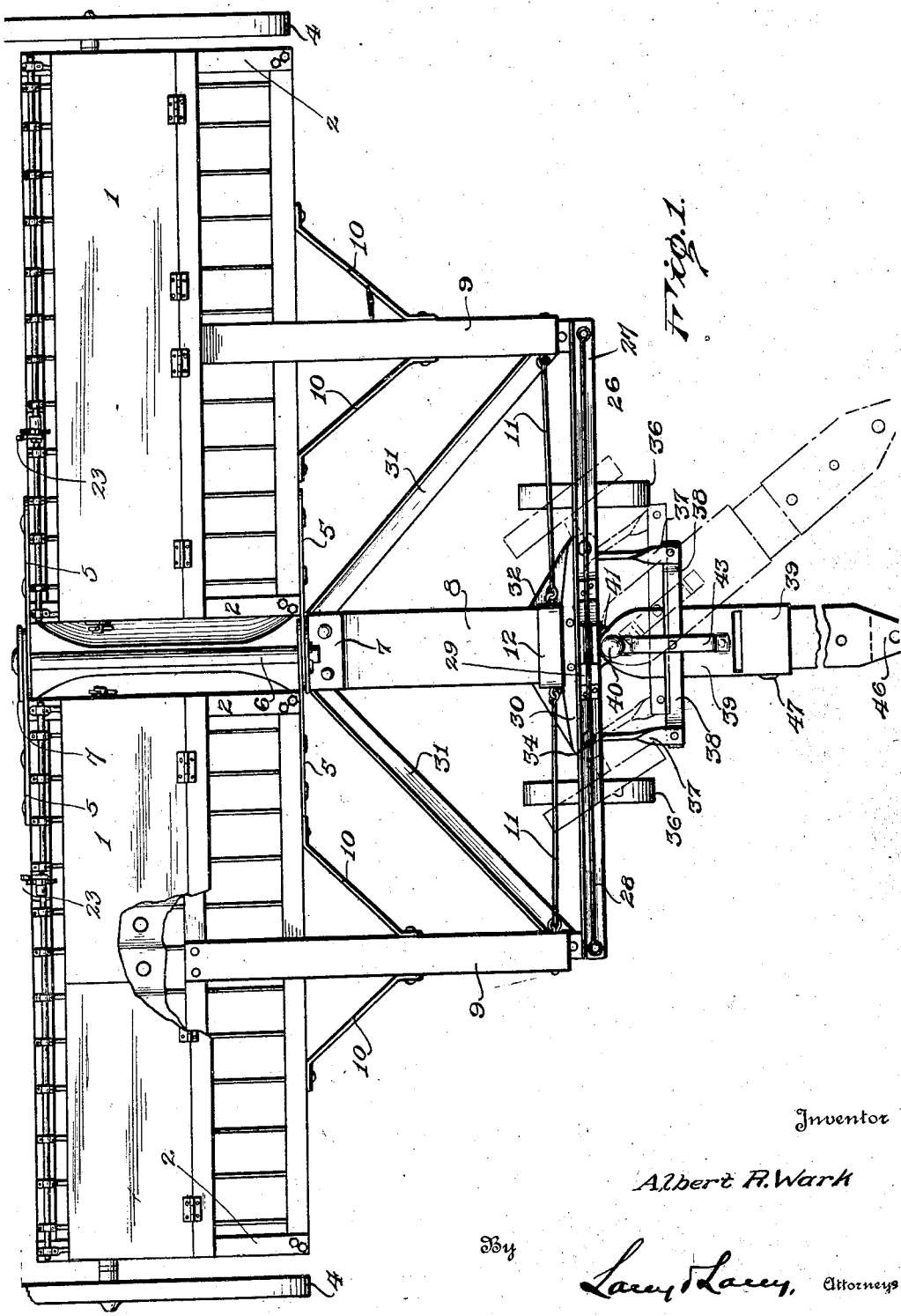

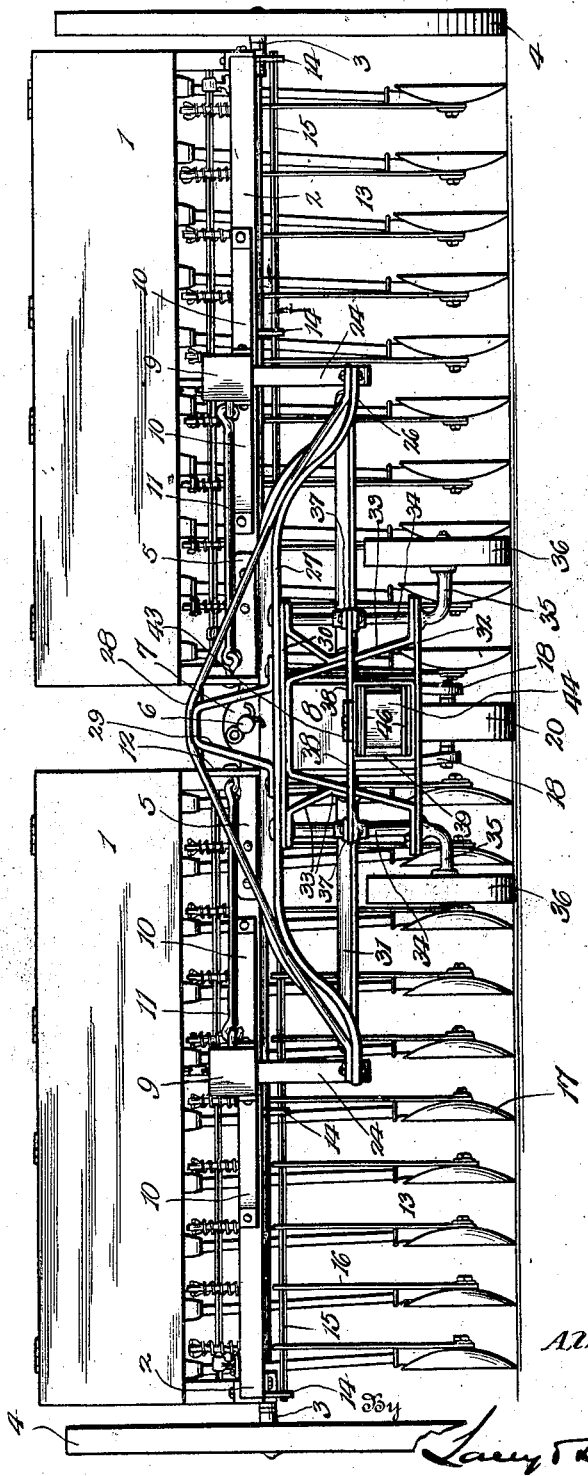

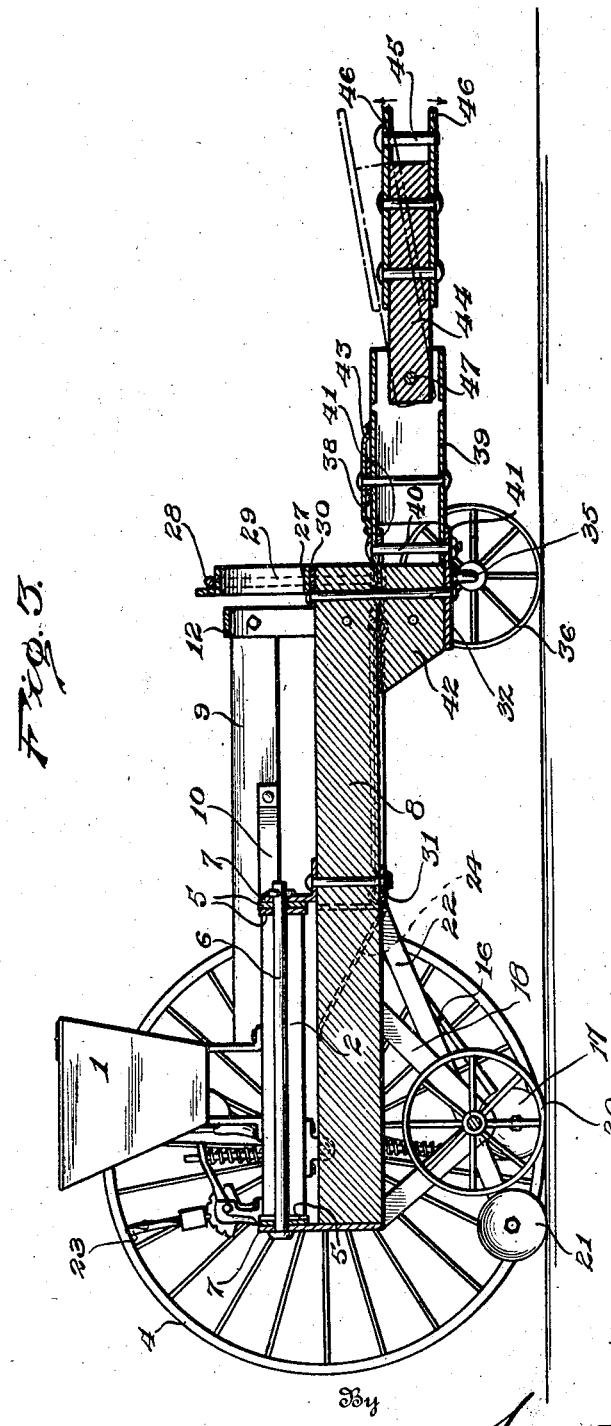

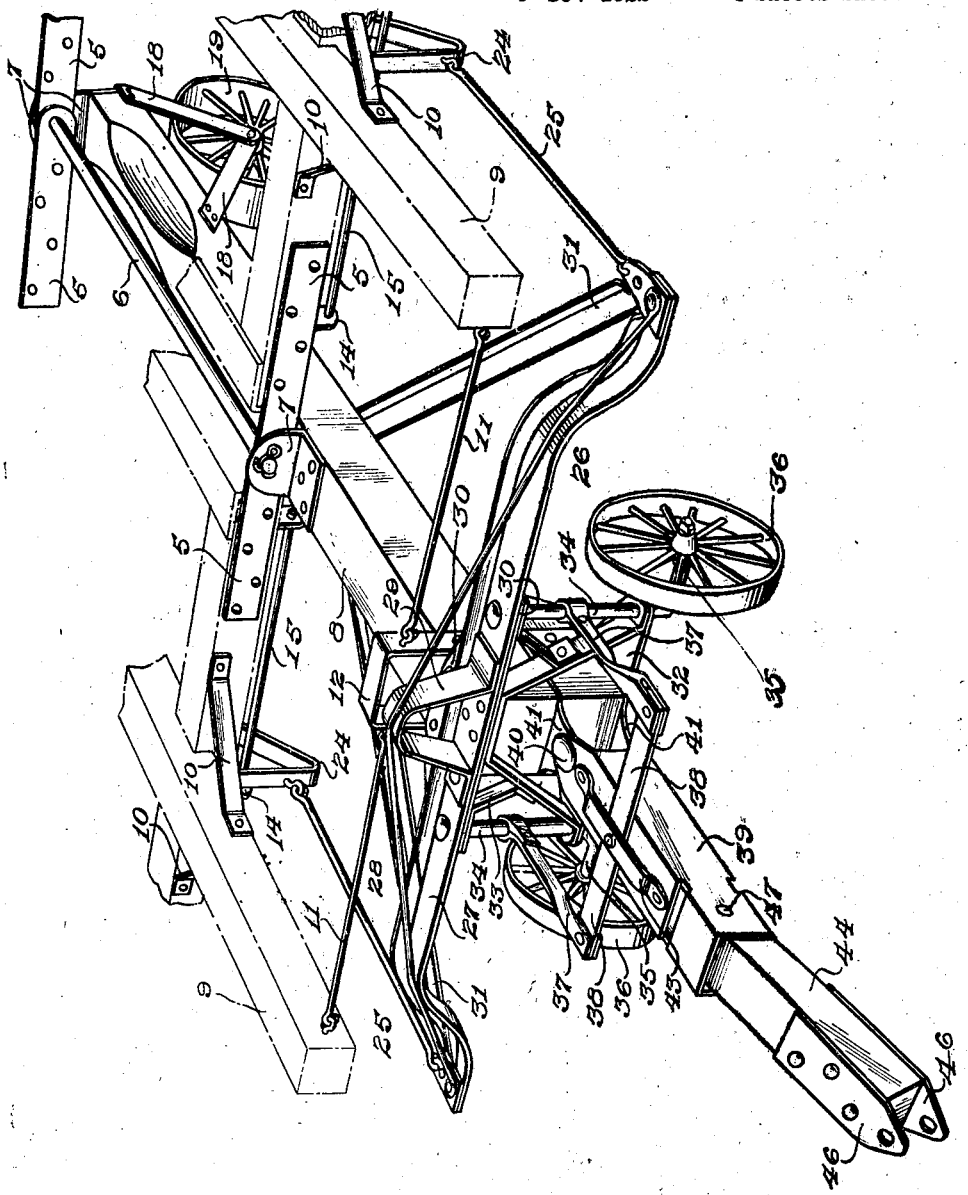

1,484,244

UNITED STATES PATENT OFFICE.

ALBERT R. WARK, OF REXFORD, KANSAS.

PLANTER.

Application filed May 16, 1922. Serial No. 561,408.

*To all whom it may concern:*

Be it known that I, ALBERT R. WARK, a citizen of the United States, residing at Rexford, in the county of Thomas and State of Kansas, have invented certain new and useful Improvements in Planters, of which the following is a specification.

This invention relates to agricultural machines and has special reference to the means for hauling a seed drill or other planter over a field. One object of the invention is to provide means whereby a wide swath may be planted at one time without part of the drill tubes or other seed-depositing members becoming embedded in the earth while other parts remain elevated therefrom. A further object of the invention is to provide means whereby the planters may be coupled to a tractor and drawn over the field close behind the same so that the draft upon the tractor will be lessened and side draft avoided. A further object of the invention is to provide means whereby the draft-applying elements may rock relatively to the planters so that oscillation of the planters, due to inequalities in the surface of the ground, will not disturb the connections between the planter and the draft-applying instrumentality. A further object of the invention is to provide a draft-applying frame of such construction and arrangement that a very short turn may be made and the draft will be applied to the planter at such point that it will be most advantageously utilized. The several stated objects of the invention and other incidental objects which will hereinafter appear are attained in the use of such an apparatus as is illustrated in the accompanying drawings.

In the drawings—

Figure 1 is a plan view of a planter or seed drill embodying my invention;

Fig. 2 is a front elevation of the same;

Fig. 3 is a central longitudinal section through the draft frame with a planter in elevation;

Fig. 4 is an enlarged perspective view of the draft-applying elements.

In the illustrated embodiment of the invention, I have shown two planters 1 which may be of any well-known or preferred construction and which are arranged in axial alinement. Mounted in suitable bearings on each planter frame 2 is an axle 3, upon the outer end of which is a ground wheel 4. The inner ends of the axles may be arranged under the planter frames or they may be connected by a universal joint. To the front and rear sills or cross beams of the planter frames, I secure brackets or supporting plates 5 which project beyond the inner ends of the respective planter frames and have their extremities overlapping and receiving a pivot bolt 6 which passes therethrough. The ends of this pivot bolt 6 are supported by brackets or short posts 7 secured upon and rising from the main tongue 8 which is disposed between the inner ends of the planter frames and projects forwardly therefrom, as clearly shown. Each planter frame has secured thereto the rear end of an auxiliary tongue 9 which projects forwardly from the planter frame and terminates substantially in the same transverse plane as the main draft tongue 8, as shown most clearly in Fig. 1. Braces 10 are secured to the auxiliary tongues 9 and to the front cross bar of the respective planter frame so as to impart rigidity to the structure, and the front ends of the auxiliary tongues are connected with the front end of the main tongue by links 11 which have their ends hingedly attached to the auxiliary tongues and to a bracket or arch 12 secured to and rising from the main tongue. The links 11 will obviously permit relative movement of the several tongues in vertical planes and the pivotal connection between the planter frames provided by the bolt 6 and the brackets 5 will permit the planter frames to rock or oscillate relatively to each other so that they may conform to irregularities in the surface of the field being planted. By connecting the planter frames in the described manner, I advantageously employ two planter frames each of which is of less width than the maximum planter now commonly produced or used, while the combined capacity of the two coupled planters is greater than that of the single planter of maximum capacity now known to me. In employing a planter or seed drill of maximum width, it frequently happens that one end of the planter will drop considerably below the other end when passing over a field which is not level, the result being that some of the seed tubes or drills will penetrate the ground to a depth too great to permit the seed to properly develop while other drills or seed tubes will be above the ground to such an extent that the seed will not be deposited in the ground but will merely drop onto the surface. By the use of my arrangement, these objections are overcome inasmuch as smaller planters may be employed and the connection between them will permit them to readily follow the irregularities in the surface of the field while maintaining all the seed drills or tubes in proper planting position.

The seed drills or tubes are indicated at 13 in the accompanying drawings and may be of any well-known type, and I also provide upon the front cross beam or sill of the planter frame depending brackets or hangers 14 in which are secured draft rods 15, upon which the front ends of supporting arms 16 are secured, these arms 16 carrying at their rear ends cultivator disks 17 or the usual seed coverers. I also secure to the sides of the main tongue 8 at the rear end thereof, hangers 18 between the lower ends of which is mounted a roller 19, as shown in Fig. 4, or a wheel 20, as shown in Fig. 3. This roller or wheel constitutes a rear truck to support the draft tongue 8 and thereby aid in minimizing the strain upon the tractor or upon draft animals so that the draft of the machine is reduced. Arranged to run in rear of the truck 19 or 20, as the case may be, are coverers 21 which are carried by long arms 22 secured to the planter frame, as will be readily understood. When moving the machine from one field to another field, the several coverers may be lifted out of contact with the surface of the ground through any preferred lifting device, a lifting lever 23 being illustrated conventionally. The coverers and cultivator disks will, of course, be spaced apart the usual distance or such distance as may prove most efficient.

I also secure to the front cross bar of each planter frame, immediately under the auxiliary draft tongue 9, a hanger or depending bracket 24 to the front end of which is pivotally or hingedly attached the rear end of a draft link 25 and the front end of each of said links is attached in a like manner to the end of a truss frame 26 which extends over and is secured to the front end of the tongue 8. This truss frame comprises upper and lower members 27 and 28 which are secured together at their ends and pass over the end of the tongue 8 and are spaced apart vertically above the tongue to accommodate an arched post 29 which is secured rigidly to the lower member or bar 27 and rises therefrom to bear against the upper member or bar 28, a very strong and rigid truss being thus produced. The lower member of the truss rests upon a plate 30 which is partly supported in direct contact with the tongue 8, and braces 31 extend between the ends of the truss and the tongue 8 and are secured to the tongue in rear of the truss so as to resist movement of the truss relative to the tongue. The plate 30 constitutes the upper member of an axle carrying frame as well as a support for the truss, the lower member of the axle-carrying frame being provided by a plate 32 similar in form and dimensions to the plate 30 and secured to the under side of the tongue, the ends of the plates 30 and 32 being disposed at opposite sides of the tongue and being re-inforced and maintained rigidly in their proper spaced relation by a bracing truss 33, shown clearly in Figs. 2 and 4. In the ends of the plates 30 and 32 and in the member 27 of the main truss are journaled the vertical spindles 34 having their lower ends turned outwardly and providing axles 35 upon which front ground wheels 36 are mounted, a simple inexpensive but strong and durable front truss being thus provided to support the front end of the main draft tongue 8 so that none of the weight of the machine is supported by the tractor or the draft animals and the power required to haul the machine over the field is thereby minimized. Radius rods or cranks 37 are secured to and project forwardly from the spindles 34 and the front ends of these radius rods or cranks are connected by links 38 which are pivoted at their outer ends to the respective cranks or radius rods and at their inner ends are pivotally connected to each other and to a short coupling member 39 which projects from the under side of the main tongue 8. This coupling member may be a hollow metallic tube or may be constructed of wood and its rear end is pivotally fitted upon a king bolt 40 which is carried by lugs or other supports 41 projecting from the tongue 8, the accompanying drawings showing the lower projection 41 as a part of the plate 32, and the upper projection 41 as formed upon a plate held by and between the tongue 8 and a block 42 upon the under side of the same but this particular arrangement may be varied. To prevent vertical movement and consequent possible loss of the links 38, I provide a keeper or guard 43 secured upon the upper side of the coupling member 39 and passing over the inner ends of said links, as shown clearly in Figs. 3 and 4. Within the front end of the coupling member 39, I secure the rear end of a second coupling member 44 which is in turn connected to the tractor by a coupling pin or bolt 45 inserted through the draw bar usually found upon a farm tractor, and through the front ends of the plates 46 carried by the front end of the coupling member or draw head 44. The coupling pin 45 is disposed vertically so that the draw head and the draw bar of the tractor may have relative pivotal movement in a horizontal plane, while the rear end of the drawhead 44 is connected to the front end of the coupling member 39 by a pivot pin or bolt 47 which is disposed horizontally and thereby permits relative pivotal movement of these parts in a vertical plane.

From the foregoing description, taken in connection with the accompanying drawings, it will be seen that I have provided means whereby the planting mechanism may readily accommodate itself to irregularities in the surface of the field without imposing any additional or unusual strain upon the draft-applying instrumentality or the draft-transmitting frame. The links 11 and 25, which constitute the connections between the planter frames and the draft frame, are so connected that they may readily turn or rock at each end so that the draft frame may pass readily over an irregular surface without imparting excessive vibration to the planter frames and likewise the planter frames may pass over the irregular surface without setting up oscillation or vibration in the draft frame. The members by which the draft frame is coupled to a tractor may swing readily from side to side about the king bolt 40 as a center and the side movement of these members will be transmitted through the links 38 and the radius rods or cranks 37 to the spindles 34 so that the wheels 36 will be disposed at an angle to the planter frame and very short turns may be negotiated, as will be readily understood upon reference to the dotted lines in Fig. 1. The axle-carrying frame consisting of the plates 30 and 32 and the truss brace disposed between and connected with said plates furnishes a very strong support for the spindles 34 and the wheels 36 so that collapse of the draft frame is not apt to occur even under very severe usage. The truss 26 is so disposed and formed that ample clearance for the front truck wheels 36 is provided while at the same time the draft transmitted through the links 25 to the hangers is applied to the planter frames below the tops thereof and is, consequently, most advantageously utilized. Moreover, the portion of the draft transmitted through the main tongue 8 and through the links 11 to the auxiliary tongues 9 is applied at points below the hoppers of the planters so that any tendency of the upper portions of the planters or the planter frames to swing forwardly relative to the lower parts thereof is effectually overcome and the machine may be drawn over the field with no noticeable tendency to dig into the ground. The construction and arrangement of the draft frame, furthermore, is such that the draft is evenly distributed, and inasmuch as the truck frame and the main transverse truss may rock or oscillate to accommodate irregularities in the surface, there is no side draft on the tractor and turning corners may be very easily accomplished. Inasmuch as the planters are mounted so as to conform to the surface of the ground, the seed will be planted at an even depth and the hoppers or seed boxes may be very easily filled inasmuch as it is possible to drive a loading wagon close behind the same. The connection between the front truck and the tractor consisting of the drawhead 44 and the coupling member 39 may be very short so that the planter will travel close behind the tractor and, consequently, the strain upon the tractor and the planter will be minimized, while the withdrawal of the single bolt or coupling pin 45 will release the planter from the tractor. Inasmuch as the planter frame will be connected close to the tractor and the draft is applied at the center of each planter frame and at a relatively low point thereof, the apparatus may be moved backwardly, if necessary, very easily and the operator may readily watch the progress of the work so that he will be informed at all times whether the drills are operating properly. While I have illustrated only two planter frames and one draft frame, it will be understood that a greater number of planters may be coupled up to a single tractor if desired, it being only necessary to provide more draft frames and have a common connection between all the said frames and the coupling bar of the tractor, as will be readily understood.

Having thus described the invention, what is claimed as new is:

1. The combination of a pair of axially alined planters, wheels supporting the outer ends of the planters, a draft tongue disposed below the inner ends of the planters, auxiliary tongues fixed to and projecting forwardly from the planters, a pivotal connection between the inner ends of the planters and the main draft tongue whereby the inner ends of the planters will be supported by the main draft tongue for free relative movement, flexible connections between the front ends of the main tongue and the front ends of the auxiliary tongues, and wheeled supports for the main draft tongue.

2. The combination of a pair of axially alined planters, a draft tongue disposed below the inner ends of the said planters, a pivotal connection between the inner ends of the planters and said tongue whereby the inner ends of the planters will be supported by the draft tongue for free relative movement, wheels supporting the outer ends of the planters, auxiliary tongues projecting forwardly from the planters, hangers depending from the planters in the vertical planes of the said auxiliary tongues, a rigid transverse truss carried by the front end of the draft tongue, flexible connections between the ends of said truss and the said hangers, flexible connections between the front ends of the draft tongue and the auxiliary tongues, and wheeled supports for the draft tongue.

3. The combination of a pair of axially alined planters, wheels supporting the outer ends of the planters, a draft tongue disposed below the inner ends of the planters, a pivotal connection between the inner ends of the planters and the said tongue, wheeled supports for said tongue, auxiliary tongues projecting forwardly from the planters, hangers depending from the planters below said auxiliary tongues, a transverse truss carried by the front end of the draft tongue, transverse links having their outer ends connected to the front ends of the auxiliary tongues for free movement relative thereto and their inner ends connected to the draft tongue for free movement relative thereto, and longitudinal links having their rear ends connected to the hangers for free relative movement and their front ends connected to the ends of the transverse truss for free relative movement.

4. The combination of a pair of axially alined planters, wheels supporting the outer ends of the planters, a tongue supporting the inner ends of the planters for free independent oscillation, auxiliary tongues projecting forward from the planters, a transverse truss secured to the front end of the draft tongue, said truss comprising a lower member secured directly upon the draft tongue, a post rising centrally from said member and an upper member passing over the said post and having its ends secured to the ends of the lower member, flexible connections between the ends of the truss and the planters, and flexible connections between the front ends of the draft tongue and the auxiliary tongues.

In testimony whereof I affix my signature.

ALBERT R. WARK. [L. S.]